(12) United States Patent
Parker

(10) Patent No.: US 9,091,611 B2
(45) Date of Patent: Jul. 28, 2015

(54) LEAK DETECTION SYSTEM WITH SECURE SEALING MECHANISM

(75) Inventor: Zachary Parker, Placentia, CA (US)

(73) Assignee: REDLINE DETECTION, LLC, Orange, CA (US)

(*) Notice: Subject to any disclaimer, the term of this patent is extended or adjusted under 35 U.S.C. 154(b) by 471 days.

(21) Appl. No.: 13/093,619

(22) Filed: Apr. 25, 2011

(65) Prior Publication Data

US 2012/0266660 A1 Oct. 25, 2012

(51) Int. Cl.
*G01M 3/22* (2006.01)
*G01M 3/02* (2006.01)

(52) U.S. Cl.
CPC .............. *G01M 3/022* (2013.01); *G01M 3/22* (2013.01)

(58) Field of Classification Search
CPC ...................................................... G01M 3/022
USPC ................................................... 73/40.7
See application file for complete search history.

(56) References Cited

U.S. PATENT DOCUMENTS

| | | | |
|---|---|---|---|
| 3,024,200 A | 3/1962 | Smith | |
| 4,524,607 A * | 6/1985 | Pelletier et al. | 73/40.5 R |
| 4,905,931 A | 3/1990 | Covey | |
| 5,022,435 A | 6/1991 | Jaw-Shiunn | |
| 5,328,152 A * | 7/1994 | Castle | 251/252 |
| 5,859,363 A | 1/1999 | Gouge | |
| 5,922,944 A | 7/1999 | Pieroni et al. | |
| 6,018,615 A | 1/2000 | Loblick | |
| 6,142,009 A | 11/2000 | Loblick | |
| 6,175,987 B1 | 1/2001 | Harvey | |
| 6,336,482 B1 | 1/2002 | Cunkle et al. | |
| 6,361,752 B1 | 3/2002 | Demarest et al. | |
| 6,392,227 B1 * | 5/2002 | Banyard et al. | 250/302 |
| 6,439,031 B1 | 8/2002 | Pieroni et al. | |
| 6,526,808 B1 | 3/2003 | Pieroni et al. | |
| 6,907,771 B2 * | 6/2005 | Finlay et al. | 73/40.7 |
| 7,081,106 B1 * | 7/2006 | Guo et al. | 604/167.06 |
| 7,305,176 B1 | 12/2007 | Pieroni et al. | |
| 2002/0152801 A1 | 10/2002 | Burke et al. | |
| 2003/0047881 A1 | 3/2003 | Worm et al. | |
| 2007/0079649 A1 | 4/2007 | Nauseda et al. | |
| 2010/0095746 A1 * | 4/2010 | Lund | 73/40.7 |

* cited by examiner

*Primary Examiner* — Laura Martin
*Assistant Examiner* — Alex Devito
(74) *Attorney, Agent, or Firm* — Stetina Brunda Garred & Brucker

(57) ABSTRACT

An automotive leak detection system that includes means for forming a secure, leak-proof interconnection between a source of pressurized leak detection vapor and the automobile engine's air induction system ducting or hose. The system includes a sealing mechanism that is specially contoured and configured to matingly interconnect about the opening defined about the distal-most end of the air induction system ducting or hose such that the sealing device and hose form a secure, leak-proof interconnection. The sealing device may be provided with a customized periphery that is designed to correspond and matingly engage with the footprint or specific configuration of the distal end of the air induction system ducting or hose of a specific car manufacturer and/or specific make and model air induction system ducting or system.

14 Claims, 1 Drawing Sheet

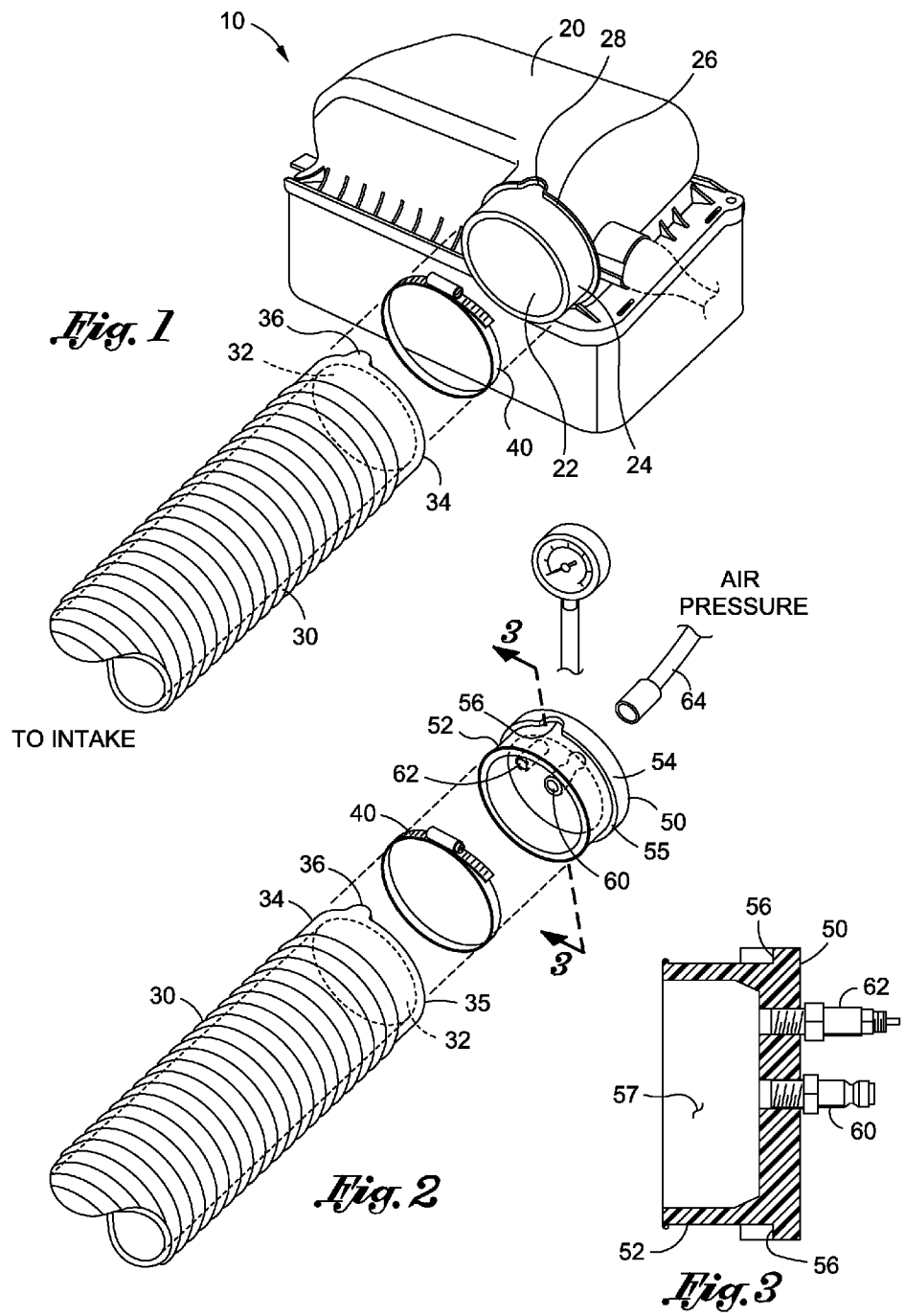

LEAK DETECTION SYSTEM WITH SECURE SEALING MECHANISM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention is directed to improve leak detection systems, and more particularly, automobile-based leak detection systems that utilize higher pressure vapor as deployed through the automobile's air induction system via a sealing mechanism that forms a secure interconnection that minimizes vapor leaks and pressure loss at the interface where such pressurized vapor is delivered to the automobile's air induction system using the automobile's own induction system ducting or hose.

Systems and methods for detecting leaks in internal combustion engine systems are well-known in the art. In this regard, leak detection systems are extensively used in engine diagnostic and maintenance procedures, and in particular can be utilized to find leaks in EVAP systems, valves, gaskets, hoses, vacuum lines and reservoirs, throttle bodies, EGR valves, air intake ducting, intake manifolds, and exhaust systems among others.

The detection of leaks is important insofar as most systems of the internal combustion automobile are designed to be completely sealed. To the extent leaks are present in these systems, a wide range of consequences can occur, including loss of performance, increased fuel consumption, and drivability complications.

Historically, vapor from leak detection systems (smoke machines) has been delivered into the automobile system under test at the standard EVAP test pressure of 12-14 inches of water column pressure (0.47 psi). The most common delivery method has typically been accomplished by pressing the tapered nozzle at the end of the smoke output hose of the leak detection device into an automobile's vacuum hose, brake booster line, or EVAP service port adaptor among others. To test automobile air intake ducting and air induction systems a common method has been to disconnect the air filter housing from the ducting and insert a hollow, elastomeric tapered cone (see, e.g., U.S. Pat. No. 5,753,800 issued to Gillum May 19, 1998, entitled SMOKE GENERATING APPARATUS FOR IN SITU EXHAUST LEAK DETECTION, the teachings of which are incorporated by reference) with a vapor pass-through hose into which is inserted the tapered nozzle at the end of the smoke output hose of the leak detection device.

Historical leak testing of the different automobile systems of naturally aspirated internal combustion engines at the low pressures used above has been quite effective and useful. One reason is that the maximum load on the air intake system of a naturally aspirated internal combustion engine is approximately 1 psi of vacuum at idle and load reduces thereafter. Test pressure (0.47 psi) at approximately half of maximum load (1 psi) is adequate to find leaks. While the interface between the leak detection device and the automobile system is quite rudimentary, the low pressures historically used above are very forgiving.

In an effort to gain more power using less fuel, automobile manufacturers are increasingly turning to a gas compressor used for forced induction or boosting the air induction system of internal combustion engines by utilizing mechanical superchargers, exhaust gas turbines, turbo chargers and multiple turbo chargers among others. The amount of boost or increased intake pressure can be 6-9 psi on the low end for smaller engines up to and exceeding 36-40 psi under full load for larger engines. Not only are the air induction system components of boosted engines under much greater pressure than naturally aspirated engines, there are typically many additional components such as a super charger or turbo charger(s), intercooler or air charge cooler, recirculation valve assembly, throttle housings, boost sensors and waste gates among others. Boosted engines also require much longer air induction ducting. On a engine with twin turbo chargers, there can be up to 23 feet of intake ducting/piping as compared to 3-7 feet in a naturally aspirated engine.

In this regard, the detection of leaks is critically important insofar as the air induction systems on boosted engines are built with very tight tolerances and are designed to be completely sealed to operate effectively. The complications from leaks in a boosted system are multiplied with the increased pressure and may have a much larger negative impact on the performance on longevity of the engine and its components.

Similarly, the ability to detect and locate leaks in the air induction systems of boosted engines has been extremely difficult for lack of an interface to introduce higher pressure vapor. The standard EVAP test pressure of 12-14 inches of water column pressure (0.47 psi) is insufficient when the system under test is under 12 to 80 times more pressure under full load.

In order to properly test for the presence of leaks, however, it is imperative that a source of pressurized test vapor be delivered into the air induction system of the engine being tested. To that end, it is well-known to generate pressurized vapor having a visual marker combined therewith that is operative to provide a visual indicator at the site where a leak is detected. Exemplary of such systems include the SMOKEPRO® leak detection system manufactured and marketed by Redline Detection, LLC of Placentia, Calif.

Despite the fact that such systems are well-known and extensively utilized, a significant problem still arises in the art as to how higher pressurized test gas can be delivered into the air induction system of an engine such that no pressure test vapor is lost at the interface where the test gas is introduced into the air induction system. Indeed, maintaining the pressure at the point of entry into the air induction system is particularly important when attempting to detect leaks in turbocharged and supercharged engines that operate at substantially higher pressure, which in turn requires leak detection tests be conducted at least equal or greater pressure in order to insure adequate testing; however, substantial problems arise in simply forming a secure, leak-proof interconnection at the interface between where the pressurized gases are introduced into the air induction system to be detected.

In this respect, to the extent there is any loss whatsoever in pressure of the test vapor at the point of entry into the air induction system, the ability to detect leaks is severely diminished, especially when it is necessary or desired to test at higher pressures, however, substantial risk of pressure loss at the point of entry is exceptionally high insofar as the induction hoses and ducts of the air induction systems for each automobile manufacturer are different, and radically different designs are frequently used for each major automobile manufacturer, which can even vary significantly between the various makes and models of a particular manufacturer. Any loss of pressure whatsoever at the interface negates the ability to perform a pressure decay or leak down test which is the only test that will confirm that the repair(s) have solved the leaking condition with absolute certainty. In this regard, such air induction systems typically utilize an air induction housing coupled to air induction ducting or hose wherein the interface between the two is unique to each manufacturer, if not specific for a particular make and model of automobile. Because of the unique interface design or footprint between the air induction housing and air induction ducting or hose coupled therewith, there has not heretofore been available any type of design or consideration that has been made to insure that when pressurized leak detection vapors are introduced into an air induction system, or more particularly the air induction system ducting or hose thereof, that a secure interconnection can be attained that substantially minimizes, if not completely eliminates, any possibility of leaks or loss of air pressure when pressurized leak detection vapor are introduced thereinto.

Although attempts have been made to form a more secure interconnection between a source of leak detection vapor and the air induction duct of an automobile's air induction system, such as those disclosed in pending U.S. patent application Ser. No. 12/426,465 filed Apr. 20, 2009 entitled ENGINE LEAK DETECTOR AND LEAK DETECTION METHOD, the teachings of which are expressly incorporated herein by reference, such systems do not take into account the unique structure of the air induction system ducting or hose of each particular manufacturer and instead rely upon simple clamping around or about an air induction ducting or hose without any consideration of the unique design of a particular air induction system. The existing device not only eliminates the ability to test critical ducting from the air filter housing to the intake piping, it also introduces additional ducting that can introduce leaks into the test. Accordingly, there is a substantial need in the art for a leak detection system and method, and more particularly a sealing device, mechanism or interface that can insure a custom interconnection or mating engagement with an air induction hose or duct of a specific car manufacturer that substantially reduces, if not eliminates, any possibility of a loss of pressurized leak detection vapor as introduced into such air induction system. There is likewise a need in the art for such a device or interface that is of extremely simple design, exceptionally easy to use and can be manufactured to be deployed with virtually all types of pressurized leak detection systems. There is still further need in the art for such a device or interface that can be designed for use with a specific make and model of automobile air induction system that further can be reutilized as many times as necessary and operative each time to form an exceedingly secure and leak-proof interconnection.

BRIEF SUMMARY

The present invention specifically addresses and alleviates the above-identified deficiencies in the art. In this regard, the present invention is directed to a leak detection system having a sealing device or mechanism that is operative to form a substantially leak-proof interconnection with a specific make and model of air induction system such that the leak detection system can matingly engage and interlock therewith. More specifically, the present invention includes a leak detection system having a sealing device or interface having a periphery that is customized to engage and interconnect with an air induction system ducting or hose of a specific manufacturer in a manner identical to how such induction system ducting or hose interconnects with the air induction housing with which the hose is designed to interconnect.

According to a preferred embodiment, the sealing device of the air induction system includes a base member defining an outer periphery that is operative to interconnect with an air induction hose or duct of a particular make and model of engine. The periphery will be defined by grooves, detents, lips, apertures, members or any other voids or structures that are operative to complement and interconnect with an air induction hose or duct of a particular make and model of air induction system. To that end, it is contemplated that the sealing device will be manufactured to have a footprint that will matingly engage with the opening of the distal-most end of the air induction hose or duct of a particular manufacturer such that the sealing device will interconnect therewith in a manner identical to which the hose or duct interconnects with the automobile air induction housing. Such interconnection, which may be secured further through the use of connectional clamps and the like, will thus provide the most secure interconnection possible that further will enable leak detection tests to be conducted utilizing pressurized gas vapor that simulates the engine's natural operating environment and by applying pressurized leak detection vapor in the same direction as occurs as when the vehicle is in motion.

The sealing device is further provided with means for securely receiving a source of pressurized test vapor, and in particular highly pressurized leak detection vapor wellknown and commonly utilized in the leak detection arts.

In use, the sealing device is interconnected to the air induction system hose or ducting in a manner identical or as nearidentical as possible to which the air induction system hose or ducting is interconnected with the vehicle's air induction housing. Once so interconnected, the existing or original clamping mechanism is applied thereto allowing for the most accurate assessment as to the structural integrity of the connection and the leak detection testing conducted as per conventional methodology whereby pressurized leak detection vapor are introduced into the air induction system via a port or input formed on the sealing device. Advantageously, due to the secure interconnection between the sealing device and air induction hose or duct, substantially greater pressures can be applied to the air induction system without risk of leaks at the interface at which the test vapor are introduced which has not heretofore been available.

Following leak detection testing, the clamping apparatus can be removed and the interconnected air induction system hose or ducting disconnected from the sealing device and thereafter reconnected with the air induction system housing with which the air induction hose or duct is operatively interconnected.

BRIEF DESCRIPTION OF THE DRAWINGS

These as well as other features of the present invention will become more apparent upon reference to the drawings.

FIG. 1 is a perspective, exploded view of an air induction system housing and an air induction system ducting or hose interconnectable therewith wherein the housing and air induction hose are provided with a unique interface to facilitate interconnection with one another.

FIG. 2 is a perspective view of the air induction hose of FIG. 1 aligned to be interconnected with a sealing device, the latter constructed in accordance with a preferred embodiment of the present invention and operative to be interconnected with a source of pressurized vapor, the sealing device further being designed and configured to interconnect with the air induction hose in a manner identical to that of the housing in FIG. 1.

FIG. 3 is a cross-sectional view taken along line 3-3 of FIG. 2.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the Figures, and initially to FIG. 1, there is shown an air induction system 10 comprising the combination of air induction system housing 20 and air induction hose 30 designed to be coupled therewith. As is well-known and per conventional air induction design, the air induction system housing 20 and air induction hose 30 are operative to regulate and assist air flow as needed for use by the vehicle's internal combustion engine. As is also known and readily understood by those skilled in the art, the induction housing 20, induction hose 30 and the interconnection between the two can and do vary greatly amongst various car manufacturers, as well as different makes and models of a particular car manufacturer in terms of design and product configuration. The system 10 as depicted in FIG. 1 is meant to illustrate an exemplary system, namely, a Ford 3.5 liter twin turbo air induction system whereby air received into housing 20 is passed through air induction hose 30 interconnected therewith, the latter ultimately serving as a conduit that is in communication with the interior of the vehicle's combustion engine.

Notwithstanding the multitude of variations that can and do exist between various automobile manufacturers, the air induction system, such as that illustrated by system 10, is universal in nature and, for purposes of leak detection as discussed more fully herein, serves as a starting point at which the detection of leaks is ideally conducted. In this regard, it is well-recognized that leak detection is most properly conducted as "upstream" as possible, and preferably at the point where air actually enters into the induction system. It is likewise most preferred during leak detection that the application of a pressurized leak detection vapor be applied in the same directions as drive conditions whereby the test vapor is directed into the induction, as opposed to elsewhere.

In order to achieve those objectives, the present invention relies upon the specific interconnection that exists between the air induction housing 20 and air induction hose 30 coupled therewith. In the embodiment shown, the housing 20 and induction hose 30 are interconnected via an outlet 22 formed on housing 20 that is defined by a cylindrical collar or sleeve 24, upon which is formed an annular lip 26 with one or more recessed portions 28 formed thereon, the latter elements for matingly engaging with the distal-most end of induction hose 30.

With respect to the latter, induction hose 30 is provided with an annular opening 32 defined by annular periphery 34 that is designed to radially fit about cylindrical collar 24 of housing 20 and oriented in a manner such that protuberance 36 engages and fits within recess 28 formed upon lip 26. By doing so, an extremely secure connection can be formed between housing 20 and induction hose 30. To securely fasten the two to one another, a clamp 40 or other similar device may be provided to radially compress the distal-most end of induction hose 30 upon cylindrical collar portion 24.

Although depicted as having an interconnection between opening 34 about cylindrical portion 24 with protuberance 36 engaging within recess 28 of lip 26, a variety of other combinations of shapes and fittings are utilized in a variety of combinations depending upon manufacturer and can easily and readily be determined by those of ordinary skill in the art. The present invention, bearing in mind the ease by which the interconnection between air induction hose, such as 30, interconnects with air induction system housing, such as 20, seeks to exploit the custom interconnection between such components by providing a sealing device used in connection with the leak detection system that simulates as much as possible the specific interconnection between the distal end of induction hose 30 with the air induction system housing to which the same is coupled.

To that end, and as shown in FIG. 2, the present invention provides an interface or sealing device 50 that is operative to interconnect with the distal most end of induction hose 30 in the manner identical to that shown in FIG. 1. The sealing device 50, however, is specifically configured for use in forming an air-tight seal about the distal opening 32 (e.g., hose opening) of induction hose 30 so that pressurized test vapor as may be provided by source 64 through one or more valves, such as valve 60 formed upon the sealing device 50, can be introduced without any losses at the point of introduction. To achieve that end, device 50 includes a base that is provided with a cylindrical collar 52 that is sized and dimensioned to the same dimensions as provided for collar 24 of housing 20 shown in FIG. 1. Likewise, device 50 is provided with annular lip portion 54 with recessed portion 56 formed therein that corresponds to the size and dimensions of lip 26 having aperture 28 formed therein, as provided upon housing 20 in FIG. 1. The lip portion 54 defines a sealing device abutment surface 55, which is at least partially defined by the recessed portion 56 and which circumnavigates a sealing device opening 57. Likewise, the hose 30 defines a corresponding hose abutment surface 35 which is at least partially defined by the protuberance 36 and which circumnavigates the hose opening 32. In use, the distal-most end of air induction hose 30 will be fitted with sealing device 50 such that distal-most portion 34 engages annular sleeve 52 with protuberance 36 being received within recess 56. Thereafter, clamp 40, which preferably will be the same clamp utilized to interconnect hose 30 with housing 20, will be deployed about the interconnected sealing device 50 and induction hose 30 to enable the same to remain in interconnected configuration precisely in the manner by which induction hose engages housing 20.

Advantageously, the interconnection between sealing device 50 and induction hose 30 achieves the highest degree of interconnectivity and is operative to minimize, if not eliminate, any loss of pressurized vapor or test vapor applied to the air induction system of the vehicle. To that end, and as depicted in FIG. 3, the sealing device 50 will be provided with ports or valves, such as 60, 62, through test vapor may be deployed and applicable pressures monitored. The sealing device 50 is configured to be utilized with a variety of leak detection systems, and in particular smoke or detectable-vapor based leak detection systems that produce test vapor under pressure that are fed into the induction system and operative to produce a visible signal at the point of where a leak is detected. As is well known in the art, such leak detection systems can utilize a smoke-like vapor or otherwise might incorporate a dye or a fluorescent UV dye as operative to produce a visual indicator when subjected to UV light. Exemplary of such devices include the SMOKEPRO® leak detection device produced by Redline Detection, LLC of Placentia, Calif., which have been and continue to be extensively utilized throughout the world. Furthermore, due to the extremely secure interconnection between the sealing device 50 and the distal-most end of induction hose 30 coupled therewith, leak detection test vapor can be applied at substantially higher pressures, which may be as high as 40 PSI. As will be appreciated by those skilled in the art, by introducing leak detection test vapor at such higher pressures will provide for more accurate leak detection, especially in high-pressure systems, such as turbo charged engines and the like.

With respect to the construction of sealing member 50 as utilized in connection with leak detection systems, the same may be made from any of a wide variety of durable materials, including metal and molded plastic. Because the sealing device 50 as utilized in connection leak detection systems will be designed for use with specific makes and models of automobiles, it is contemplated that various elements, such as cylindrical portion 52, lip 54 and one or more apertures 56 formed thereon will be selectively formed, shaped and sized about the periphery of the base of sealing device 50 in whatever manner is appropriate to accommodate and mate with the footprint of the distal-most end of the specific air induction hose 30 of a given make and model of a vehicle engine. Accordingly, it will be readily understood that the configuration of the periphery of the sealing device 50 will vary from manufacturer to manufacturer, as well as from model to model of a give vehicle, as necessary to matingly engage the distal-most end of an air induction system ducting or hose of a specific engine. Notwithstanding, by forming the sealing device 50 so that the same complements and interconnects with the specific size and dimension of the distal-most portion of the induction hose 30 with which the device 50 is connected, the objectives of the invention can be readily realized, as will be appreciated by those skilled in the art.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A sealing system device for forming an interface between a source of pressurized leak detection vapor and an air induction system of an internal combustion engine, the sealing system comprising:

an air induction hose adapted to be connectable to the air induction system of the internal combustion engine, the air induction hose having an axially extending first mating element located on a distal end of the air induction hose which defines a hose abutment surface circumnavigating a hose opening wherein the first mating element defines a portion of the hose abutment surface; and a sealing device having a valve for receiving the pressurized leak detection vapor and transferring the vapor to said air induction hose, the sealing device further defining a periphery having:

a sealing device abutment surface circumnavigating a sealing device opening and adapted to abut the hose abutment surface when the sealing device is engaged with the air induction hose; and an axially extending second mating element at least partially defining the sealing device abutment surface, the second mating element being specifically configured and adapted for matingly engaging with the distal end of the air induction hose of said air induction system such that the first mating element and second mating element are cooperatively engaged with each other so as to prevent rotation of the sealing device relative to the distal end of the air induction hose when the peripheries are matingly engaged, said periphery being designed and configured to conform and interconnect with the distal end of said air induction hose.

2. The sealing system of claim 1 wherein said periphery of said sealing device is sized and configured to replicate the outlet of an air induction housing to which said distal end of said air induction system duct or hose is manufactured to interconnect with.

3. The sealing system of claim 1 wherein said sealing device includes at least one port for receiving a leak detection test vapor.

4. The sealing system of claim 3 wherein said leak detection test vapor comprises a pressurized test vapor having a marker vapor mixed therewith.

5. The sealing system of claim 4 wherein said marker vapor comprises a vaporized oil.

6. The sealing system of claim 4 wherein said test vapor includes a UV dye.

7. The sealing system of claim 1 wherein said sealing device is operative to transfer said pressurized test vapor to said air induction system ducting or hose at a pressure up to 40 PSI.

8. The sealing system of claim 1 wherein said sealing device includes:
   a collar; and
   a lip portion extending radially outward from the collar and circumnavigating the collar, the lip portion being sized and configured to matingly engage with the air induction hose.

9. The sealing system of claim 8, wherein the lip portion includes a recessed portion sized and configured to be complimentary to a protuberance formed on the air induction hose.

10. The sealing system of claim 8, wherein the collar is configured to be insertable within the air induction hose for interconnecting the sealing device to the air induction hose.

11. The sealing system of claim 1, wherein the sealing device is configured to overlap with the air induction hose at least in an axial direction when the sealing device is engaged with the air induction hose.

12. The sealing system of claim 1, wherein the sealing device defines a female engagement portion configured to be complimentary to and engageable with a male engagement portion defined by the air induction hose.

13. The sealing system of claim 1, wherein the sealing device abutment surface is sized and configured to at least partially overlap the hose abutment surface when the sealing device is engaged with the air induction hose.

14. The sealing system devise of claim 1, wherein the sealing device abutment surface is configured to face toward the hose abutment surface when the sealing device is engaged with the air induction hose.

* * * * *